(12) United States Patent
Subramani et al.

(10) Patent No.: US 8,583,114 B2
(45) Date of Patent: Nov. 12, 2013

(54) CHANNEL SEARCHING METHOD AND APPARATUS

(75) Inventors: Siva Kupanna Subramani, Bristol (GB); Zhong Fan, Bristol (GB); Simon Martin Daniel Armour, Bristol (GB); Dritan Kaleshi, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/354,038

(22) Filed: Jan. 19, 2012

(65) Prior Publication Data

US 2012/0115425 A1    May 10, 2012

Related U.S. Application Data

(63) Continuation of application No. 12/060,510, filed on Apr. 1, 2008, now abandoned.

(30) Foreign Application Priority Data

Apr. 2, 2007    (GB) .................................. 0706438.9

(51) Int. Cl.
*H04Q 7/20*    (2006.01)
*H04W 4/00*    (2009.01)

(52) U.S. Cl.
USPC ..................... 455/434; 455/67.11; 455/452.1; 455/453

(58) Field of Classification Search
USPC .............. 455/452.1, 450, 423, 434, 446, 464, 455/509, 454, 516, 67.11, 120, 447, 62, 77, 455/453; 370/329
See application file for complete search history.

(56) References Cited

U.S. PATENT DOCUMENTS

| | | | |
|---|---|---|---|
| 5,524,280 A | 6/1996 | Douthitt et al. | |
| 2006/0009209 A1 | 1/2006 | Rieser et al. | |
| 2006/0030318 A1* | 2/2006 | Moore et al. ................... | 455/434 |
| 2006/0189311 A1* | 8/2006 | Cromer et al. ................ | 455/434 |
| 2007/0042733 A1 | 2/2007 | Tomioka | |
| 2008/0194256 A1* | 8/2008 | Tran et al. ..................... | 455/434 |
| 2008/0259856 A1* | 10/2008 | Frederiksen et al. ......... | 370/329 |

* cited by examiner

*Primary Examiner* — John J Lee
(74) *Attorney, Agent, or Firm* — Oblon, Spivak, McClelland, Maier & Neustadt, L.L.P.

(57) ABSTRACT

A method of identifying an available channel of a plurality of frequency channels defined in a radio frequency spectrum for use by a transmitting station, wherein scanning for an available channel in a frequency spectrum is performed by a scanning method in which a bidirectional search is performed away from an initial channel frequency. The method may include steps to take when a boundary of the spectrum is encountered, and may also take into account existing information concerning channel reservation. A related scanner and radio apparatus is also described.

15 Claims, 7 Drawing Sheets

CHANNEL SEARCHING METHOD AND APPARATUS

CROSS-REFERENCE TO RELATED APPLICATIONS

This application is a continuation of U.S. application Ser. No. 12/060,510, filed Apr. 1, 2008, which is based upon and claims the benefit of priority from prior British Patent Application No. 0706438.9, filed Apr. 2, 2007. U.S. application Ser. No. 12/060,510 is incorporated herein by reference.

BACKGROUND OF THE INVENTION

1. Field of the Invention

The present invention is concerned with a method and apparatus for scanning a communications channel for an available channel slot for use in communication. The invention can be employed particularly, but not exclusively in cognitive radio, spectrum agile radio, 802.22 WRAN and any general channel tuning radio.

The invention is generally concerned with a searching mechanism for identifying a "nearest free channel" in a dynamically varying spectrum.

2. Discussion of Background

In cognitive radio, spectrum agile radio or 802.22 WRAN, portions of spectrum are regularly or permanently unused by the primary target market, and are therefore available for use by a secondary market, as noted in "The Spectrum Framework Review" (OFCOM, November 2004: available at www.ofcom.org.uk/consult/condocs/sfr/sfi), "Spectrum Policy Task Force Report" (Technical Report, FCC, ET Docket 02-135, November 2004) and "Facilitating opportunities for flexible, efficient, and reliable spectrum use employing cognitive radio technologies" (FCC, ET Docket 03-108, December 2003).

In the context of Cognitive radio or the so called Secondary market mechanism, two sets of users can be considered, namely:

the Primary User (PU)—the licensed user of the spectrum or a user recognised as having high priority for the spectrum band, and the Secondary User (SU)—an opportunistic user or "cognitive" user who accesses spectrum on a temporary basis when PUs are not making use of the spectrum.

An SU node is allowed to access the spectrum when the primary or licensed user is not using the spectrum. This is on the basis that the SU node will cease use of the spectrum when operation of the PU commences. In a distributed cognitive radio network, a radio defining an SU node scans and searches the designated range of spectrum for a free channel during reconfiguration channel switching or initial transmission. Once a suitable free channel is found, the radio switches to this channel for transmission. Conventionally, radio channel scanning and searching is done unidirectionally, either in a direction of increasing frequency or of decreasing frequency, or is a priori programmed (controlled by a base station (BS)) to select a channel. Cognitive Radio is assumed to have the capability of changing the operating frequency or channel efficiently. A generalised graph search bidirectional algorithm is described in "Artificial Intelligence: A Modern Approach" (S. Russell, P. Norvig, $2^{nd}$ Edition, Prentice Hall, 2003), "Unidirectional and Bidirectional Search algorithm" (P. Nelson, Software, March 1992) and "Bidirectional Heuristic Search Reconsidered" (H. Kaindl, G. Kainz, Journal of Artificial Intelligence Research, pages 283-317, 1997). Each of these discloses an A* search algorithm used in artificial Intelligence (AI).

The reader will appreciate that the use of this concept of division between PU and SU user devices is for the purpose of describing the present invention clearly with regard to the prior art, and an actual implementation of cognitive radio could be provided without this distinction being made, either explicitly or implicitly. Indeed, as described later, this distinction between PUs and SUs is not an essential element of the claimed invention.

Reliably sensing wide range of spectrum is a crucial issue in Cognitive radio networks. Cognitive radio related papers such as "Implementation issues in spectrum sensing for cognitive radios" (D. Cabric, S. Mishra and R. W. Brodersen, Asilomer conference on Signals, systems and computers, November 2004) and "Next Generation/dynamic spectrum access/cognitive radio wireless networks: A survey" (I. Akyildiz, W. Lee, M. Vuran and S. Mohanty, Elsevier journal of Computer networks, September 2006) analyse various channel sensing and detection methods such as matched filter detection, energy detection (radiometry), and cyclostationary detection.

Other papers on channel detection "Collaborative spectrum sensing for opportunistic access in fading environment" (A. Ghasemi, E. Sousa, IEEE DySPAN, November 2005) and "Cooperative sensing among cognitive radios" (S. Mishra, A. Sahai and R. Brodersen, IEEE ICC, June 2006) analyse how collaborative sensing improves detection in a fading environment.

None of the above papers discuss the channel scanning or searching methods but Akyildiz et al. stresses the importance and need for finding or selecting a channel quickly.

"A comparison of channel scanning schemes for distributed network formation and reconfiguration" (A. O. Mahajan, A. J. Dadej, K. V. Lever, Springer journal of wireless networks, June 1998) discusses channel scanning schemes but analyses synchronous scanning (round robin) and Asynchronous scanning (random scanning).

U.S. Pat. No. 5,613,208 discloses, in general terms, a method of scanning a channel in a cellular system. KR20010058553, KR960004811B and U.S. Pat. No. 4,977,611 describe further application of channel scanning in portable radio apparatus.

SUMMARY OF THE INVENTION

An aspect of the invention provides a mechanism for scanning and searching for a nearest free channel through bidirectional and/or spiral sensing, for a dynamically varying spectrum.

In cognitive radio, it is desired to be able to sense reliably a wide range of spectrum. By adopting bidirectional search, the searching is performed in either direction, starting at a frequency and expands through the channel search space in both directions to find the nearest free channel for transmission. While searching for a free channel, a conventional unidirectional scanning approach would miss an available free channel if it is available in the direction away from the direction of search. Thus, a unidirectional or sequential free channel search does not ensure identification of the nearest channel. By finding the nearest free channel to the current channel, the radio and transmission parameters (sampling rate, ADC, matching filter, antenna gain and sensitivity) undergo very few (in certain cases, minimal) changes during reconfiguration. In order to find a nearest free channel while scanning, a bidirectional-spiral searching algorithm enhances the identification of the nearest available free channel.

Another aspect of the invention provides a method of scanning a channel in a generally spiral or bidirectional mode. The mode of scanning may be considered as expanding from a start point, searching alternately in each direction and progressively away from the start point. An advantage of at least one embodiment of the invention is that such an approach ensures identification of the nearest free channel from the starting or switching channel. Another advantage of at least one embodiment of the invention is that, on average, it identifies a free channel with a number of steps which is at most equal to previous techniques.

Another aspect of the invention provides a scanning scheme to take account of encountered boundary conditions. One embodiment employs spiral search and then, on encountering a boundary of the channel, a jump away from the boundary. The jump may be random, or may be by a predetermined amount, or by an amount determined by any other means. Another embodiment employs the spiral searching mechanism and then, on encountering a boundary condition, a unidirectional search in a direction away from the boundary.

Aspects of the invention may incorporate, into a provided search mechanism, a responsiveness to external information concerning the channel, such as the reservation of parts of the channel by third parties.

The invention may be implemented by way of hardware or software. In the latter case, the invention may be provided by way of a computer program product which can be in the form of a computer readable storage medium, such as an optical disk or an electronic mass storage device, or a computer readable signal such as a signal received in response to a download request sent by a networking apparatus, either wireless or over a physical connection.

DESCRIPTION OF THE DRAWINGS

A more complete appreciation of the invention and many of the attendant advantages thereof will be readily obtain s the same becomes better understood be reference to the following detailed description when considered in connection with the accompanying drawings, wherein.

DETAILED DESCRIPTION OF THE PREFERRED EMBODIMENTS

Figure 7:
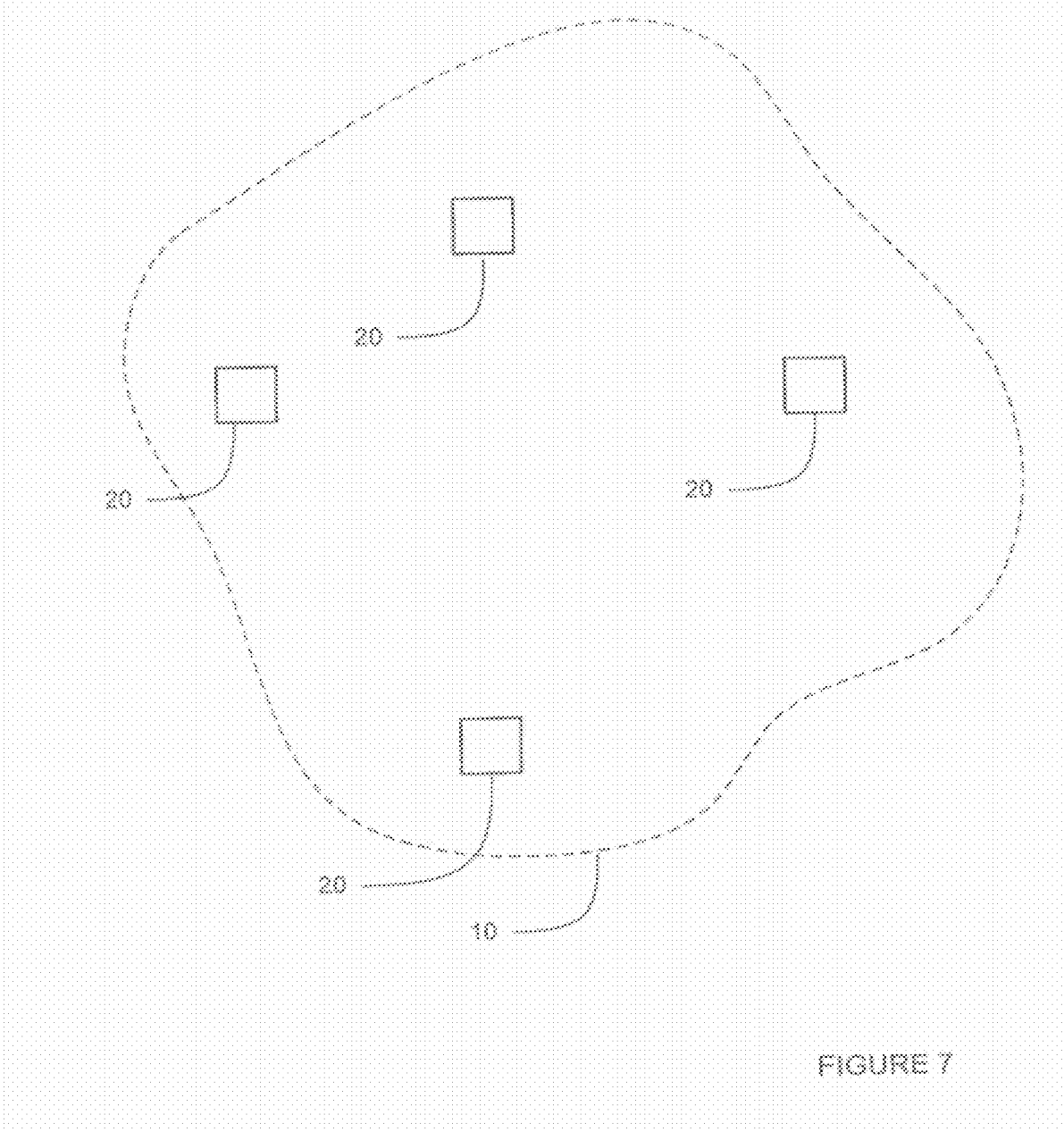
FIG. 7 illustrates a schematic diagram of a radio communications network in accordance with the specific embodiment of the invention.

Referring now to the drawings, wherein like reference numerals designate identical or corresponding parts throughout the several views, the invention will be described with reference to a specific embodiment comprising a wireless communications network 10 as illustrated in FIG. 7. The network comprises a number of wireless communications stations 20, each of which is enabled to communicate on a channel defined in an available spectrum. Channels are defined in the spectrum by way of frequency. Thus, it is possible to discuss channels as being relatively higher or lower than one another with respect to frequency.

Figure 8:
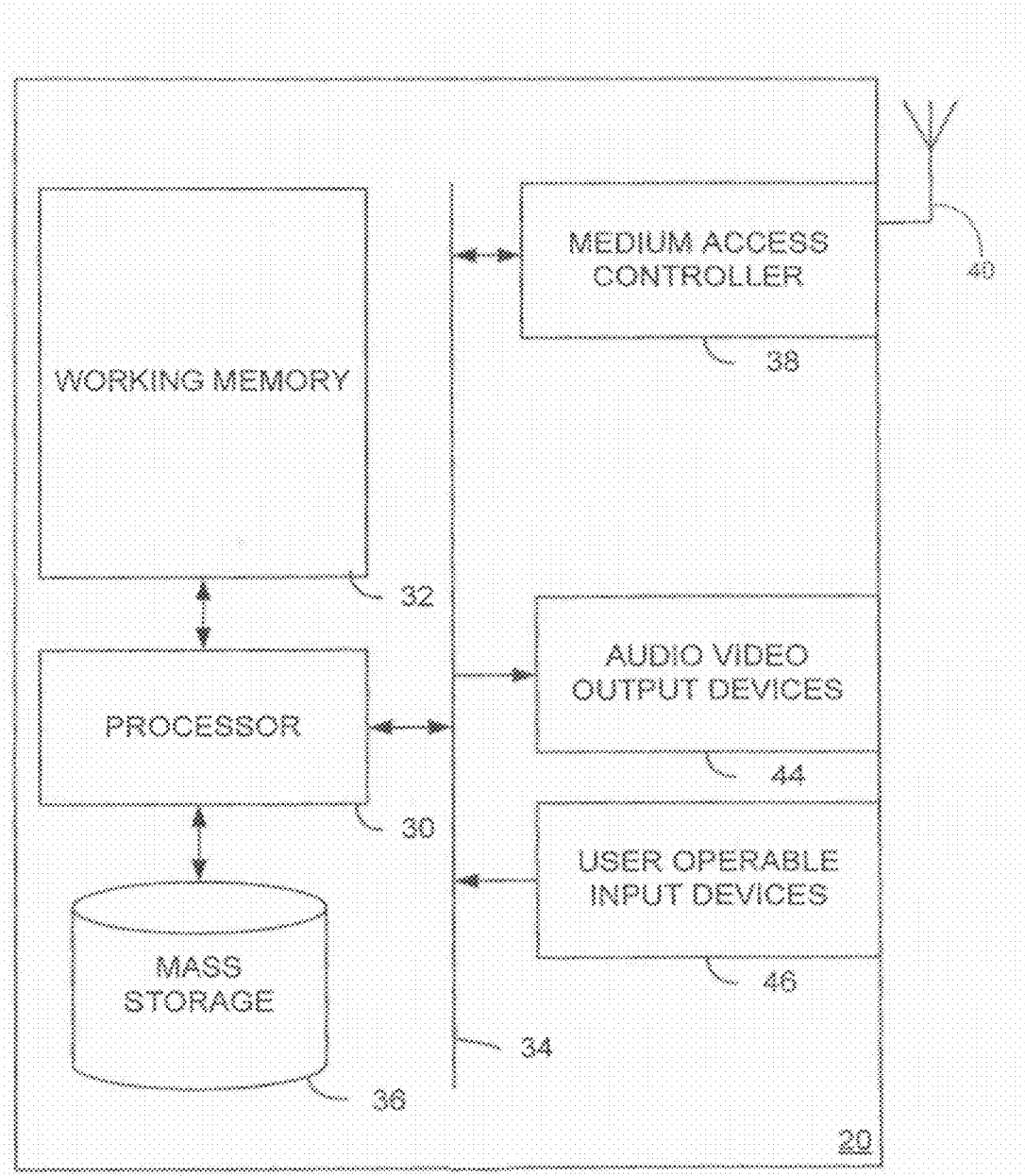
FIG. 8 illustrates a schematic diagram of a radio communications station of the network illustrated in FIG. 7.

Each wireless communications station 20 is implemented in hardware of known type, as illustrated in FIG. 8. FIG. 8 illustrates the wireless communications station 20 as being implemented by means of a general purpose computer with communications facilities. In this case, communications facilities are provided by means of hardware, which is in turn configured by means of software. More particularly, the station 20 comprises a processor 30, in communication with the working memory 32 and a bus 34. A mass storage device (which, in this case, is a magnetic storage device, though other such storage devices would suffice) 36 is provided for long term storage of data and/or programs not in immediate use. A medium access controller 38 is connected to an antenna array 40, to provide the station 20 with access to the wireless communications medium. The medium access controller will manage the station's access to the communications medium, i.e. the available radio spectrum, including functions such as scanning (the subject of this disclosure) and other functions such as reservation, and data assembly and transmission.

In conventional manner, the station 20 further comprises audiovisual output devices 44 and user operable input devices 46.

It will be appreciated that the scanning function could be an integral part of the station 20 or could be a separate component performing only the scanning function.

Between the working memory 32 and the mass storage device 36, the station 20 stores executable programs enabling the processor 30 to configure the station 20 to provide access to the wireless spectrum in accordance with the specific embodiment of the invention as will be described below.

Figure 1:
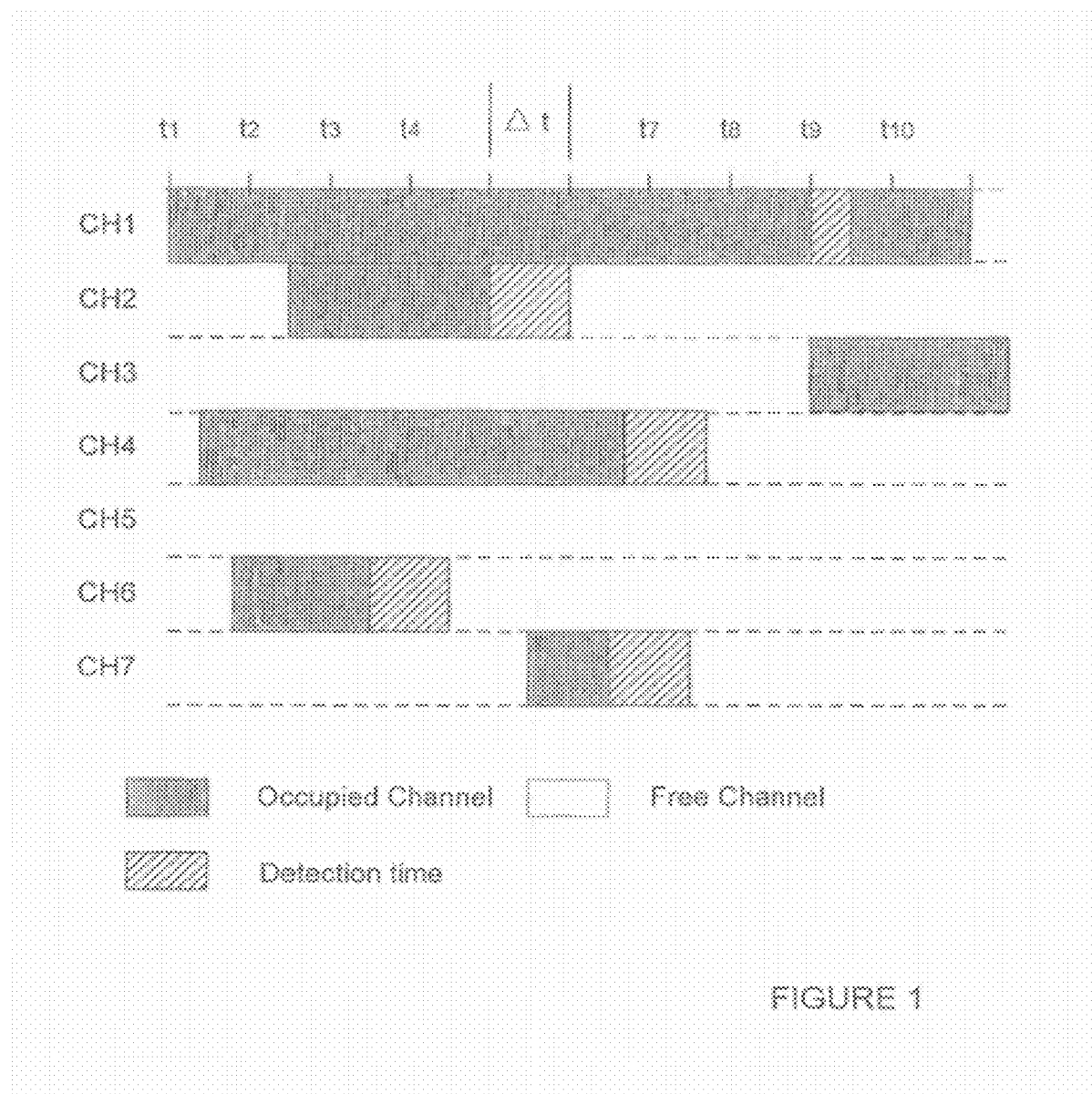
FIG. 1 is a diagram illustrating examples of channels defined in a frequency spectrum.

The spectrum available for a cognitive user (opportunistic user) comprises a wideband spectrum, divided into distinct frequency bands. These frequency bands need not be of equal width and, in order to sense and handle such non-contiguous bands of frequency, channels are conveniently split into equal sub-channels of a minimum resolution for detection and sensing. Each channel is sensed for detection time $\Delta t$ to ensure and estimate the occupancy nature and user requirement matching (refer FIG. 1). In FIG. 1, channel CH1 is not considered free at t9 because the time for which it is unoccupied is shorter in duration than the detection time $\Delta t$.

It will be appreciated by the reader that the present disclosure is not limited to any particular method of sensing or detecting power level or interference temperature and thus detailed description of this function of the apparatus is not described in detail herein.

The (cognitive) user station searches for the free channel either during

1. Initial assignment: when a node searches for free channel for initial transmission
2. Channel Switching: when the primary or licensed user arrives and reclaims the channels, the secondary user evacuates and looks to switch to other free channel.

Figure 9:
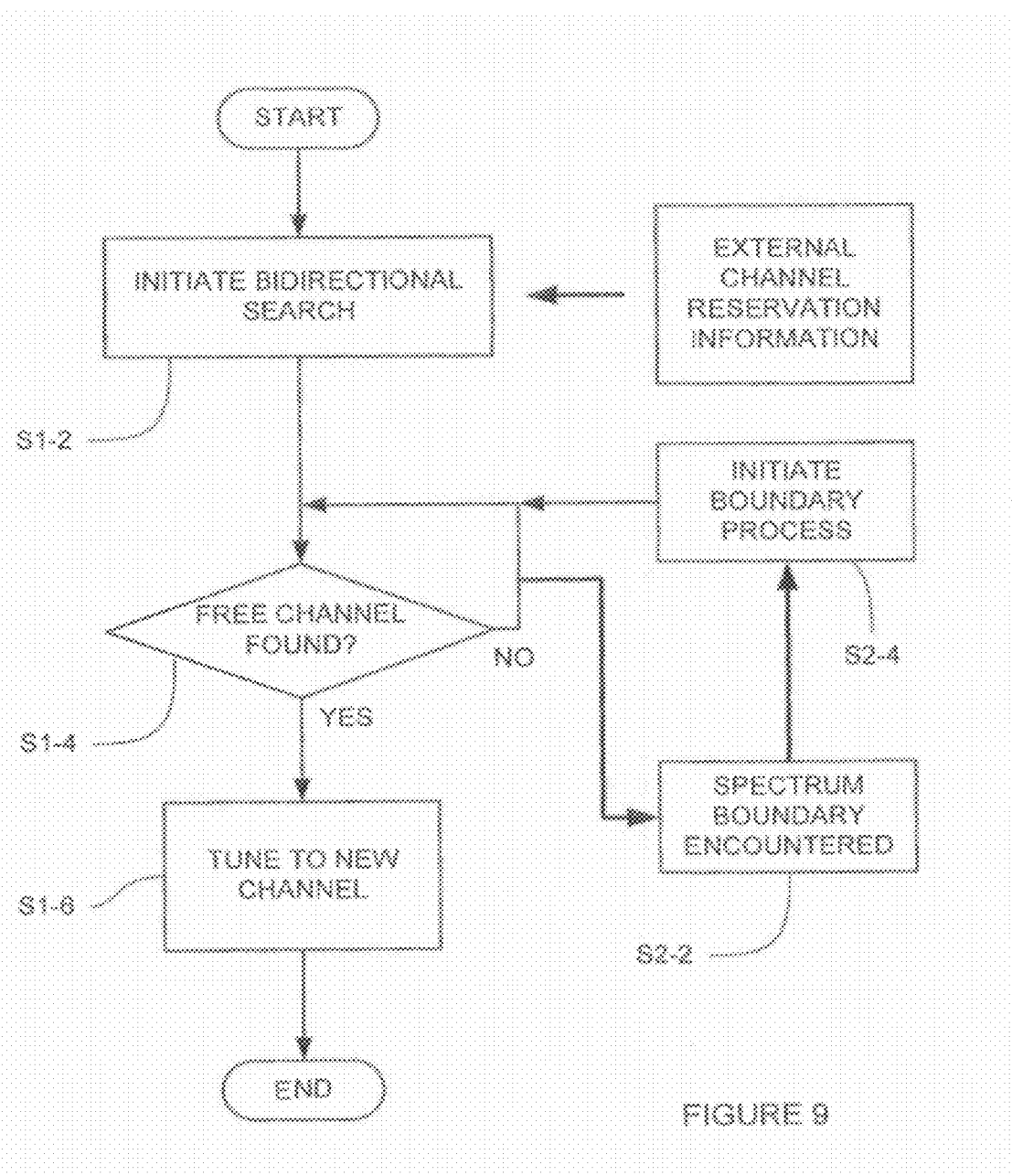
FIG. 9 illustrates a flow diagram of operation of an access controller of the radio communications station illustrated in FIG. 8.

As illustrated in FIG. 9, the method commences, for instance by user initiation at the mobile terminal, or by process initiation at the terminal, by searching (step S1-2) from the initial frequency (fx). fx may be a preferred starting frequency for initial assignment or a currently operating frequency for the channel switching scenario. The search continues (step S1-4) until free channel has been identified.

This channel searching mechanism is aimed at finding the nearest free channel from the current operating or starting frequency, so that the radio parameters would undergo minimal changes during reconfiguration. Since switching to a new free channel would in such circumstances take place on-the-fly during transmission, parameters such as sampling rate, ADC, matching filter, antenna gain/sensitivity would necessarily be changed. Corresponding receiver parameters and antenna gain matching also changes. The reconfiguration and radio parameter changes can be considered minimal when the switching channel is nearer. The nearest free channel search is improved by the proposed bidirectional-spiral searching mechanism. Once free channel has been identified, then the search ends and the station 20 tunes to the newly identified channel (S1-6). Moreover, since searching is bidirectional, spectrum in both directions is searched which diminishes the prospect of erroneous results.

Between the channel identification step (S1-4) and the tuning step (S1-6), the reader will appreciate that further steps can be included for consistency with the protocol adopted for the communications network established by the technology. For instance, a channel reservation request may be sent, or some other form of access protocol may be executed.

Further, the reader will appreciate that, although in this embodiment, the result of finding free channel will be the tuning of the station 20 to the found free channel, this need not be the case. Instead, a station could, for example, store information identifying the free channel, for instance for future use, or as a statistical record.

Figure 2:
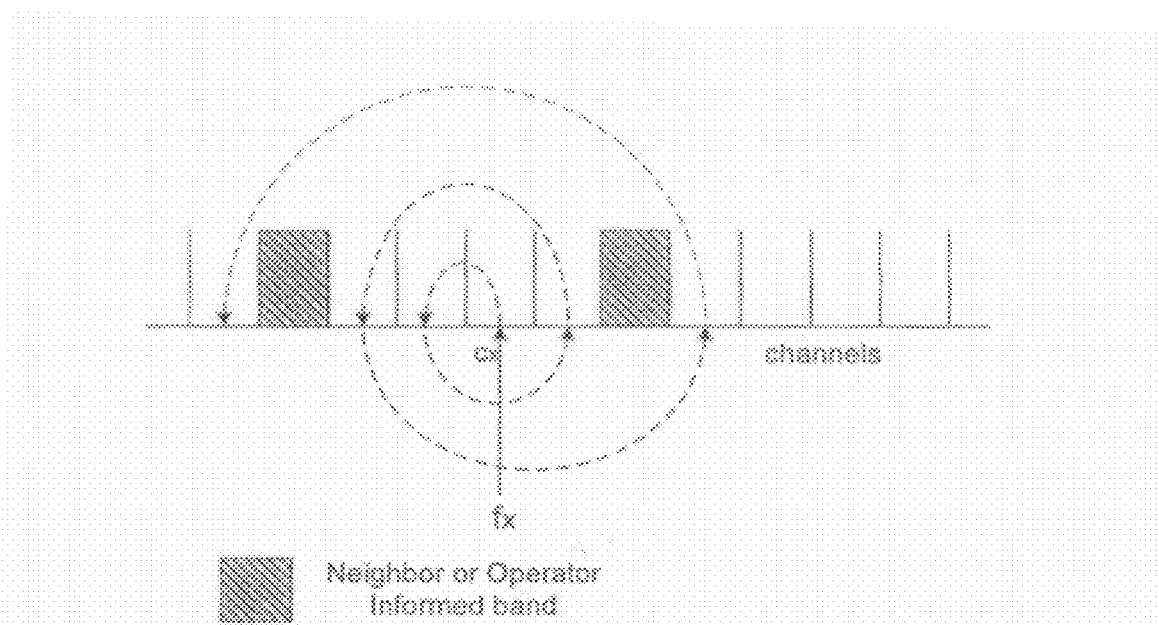
FIG. 2 is a diagram illustrating a channel searching method in accordance with a specific embodiment of the invention.

By way of explanation, a case is illustrated in FIG. 2 in which the starting frequency is fx, and the centre frequency of the channel is Cx. The mobile terminal commences sensing on either side of the channel at frequencies Cx+1, Cx−1, Cx+2, Cx−2 and so on. By this way the nearest free channel on either side of the centre frequency is searched, closest to the starting or current frequency. In contrast, unidirectional search in one direction would have missed the nearest free channel in the other direction.

As illustrated in FIG. 9, the searching process as described above and illustrated in FIG. 2 would be interrupted on encountering a boundary of the available or allowable spectrum. This interruption of the search is indicated by the thicker arrow pointing to a side process commencing, in step S2-2 with identification of the boundary. Then, in step S2-4, a boundary process is initiated, and two examples of such are described below. The boundary process commences a new search, in accordance with the particular embodiment concerned, for the identification of free channel. Once the boundary process has been initiated, the process returns to checking whether free channel has been identified.

Figure 3:
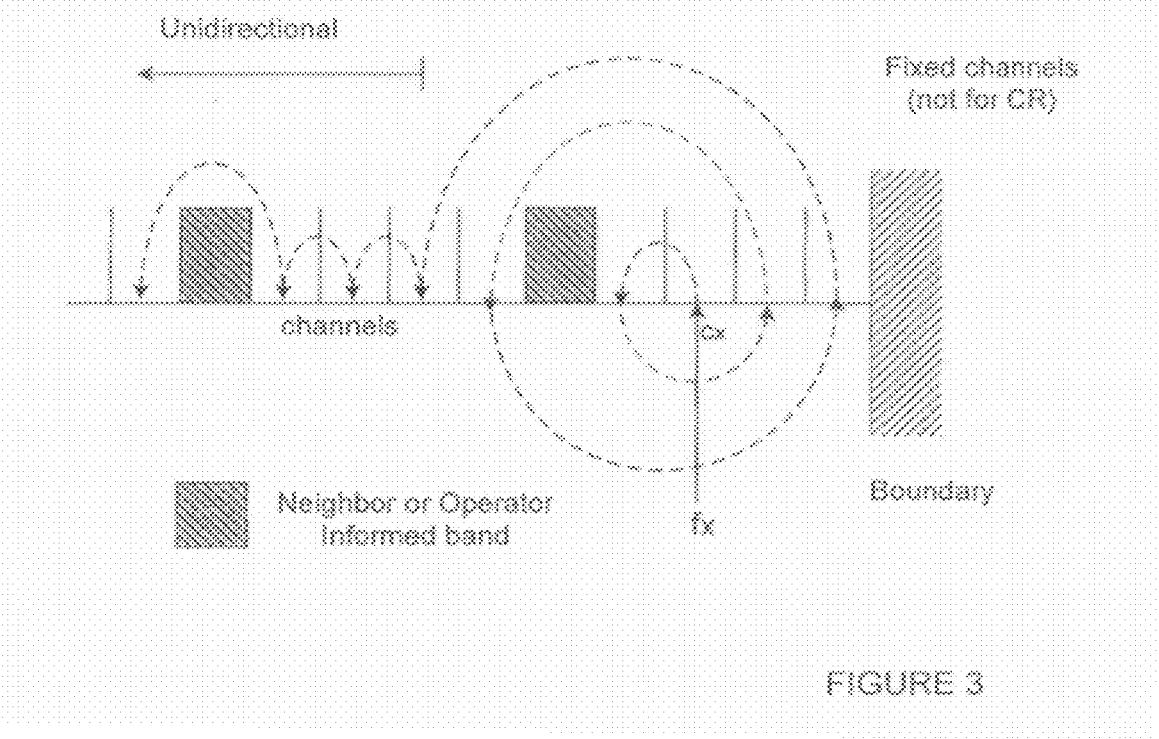
FIG. 3 is a diagram illustrating a first searching scheme in accordance with the embodiment illustrated in FIG. 2.

Referring to FIG. 3, a first searching scheme in accordance with this embodiment is demonstrated. In this spiral-bidirectional search mechanism, if one coordinate reaches a boundary of the allowed spectrum, the searching switches to unidirectional searching (in step S2-4) in a direction away from the identified edge and searching continues. This is referred to hereinafter as Spiral+Uni searching.

Figure 4:
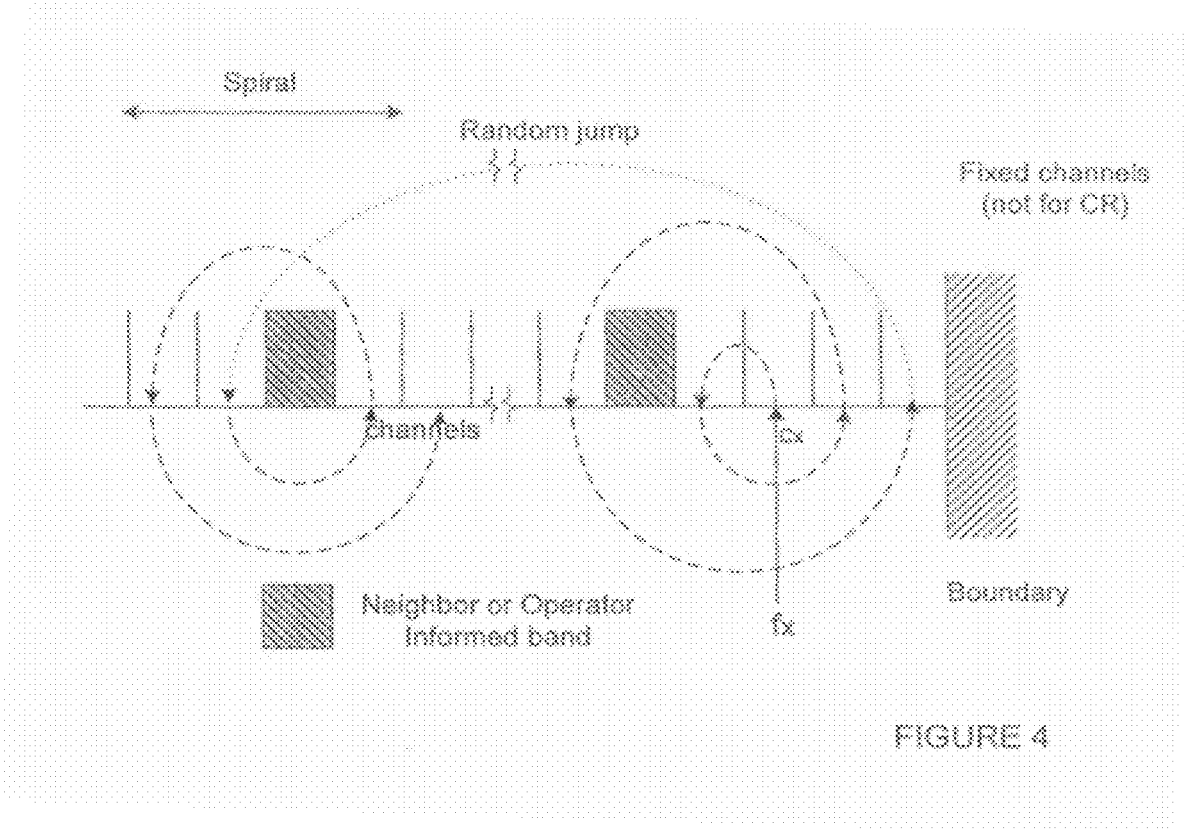
FIG. 4 is a diagram illustrating a second searching scheme in accordance with the embodiment illustrated in FIG. 2.

Referring to FIG. 4, a second searching scheme in accordance with this embodiment is demonstrated. In this case, on reaching the boundary, the boundary process is initiated (step 2-4) by invoking a random jump, in a direction away from the identified boundary and continuing Spiral/bidirectional searching. This is referred to hereinafter as Spiral+Ran searching. It will be noted by the reader that the previously described random jump embodiment of the invention is herein exemplified, although other possible embodiments could also be envisaged.

When the channel occupancy of the spectrum is non-uniform and the portion of the spectrum, on which searching is presently focused, is densely occupied, then switching to a portion of the spectrum some considerable distance away from currently searched portion is a useful option. It will be appreciated that this involves relaxation of the requirement to find a relatively near free channel. The Spiral+Ran searching scheme can be used in scenarios wherein the currently searched area does not produce fruitful results.

Referring further to FIGS. 3 and 4, the scanning/searching may skip channels which have been identified prior to commencement of searching as being occupied or reserved by third parties, such information for instance being provided by external sources (as illustrated in FIG. 9). These external sources of information may include policy messages from regulators, or cooperative neighbour devices providing reservation information identifying such portions of the spectrum or channels. Such messages may need to be evaluated for authenticity; such channels may then be skipped during the spiral searching mechanism, as illustrated.

The search terminates once free channel has been found which matches with the requirements of the device performing the search. The device then follows an initial protocol of known type to access the identified channel.

In unidirectional searching, a scanner would search in steps either in the incrementing or the decrementing direction. When the scanner searches for the nearest free channel, the unidirectional searching mechanism does not ensure the nearest/closest free channel. In a unidirectional channel search, there is a possibility that free channel may exist in the direction opposite to the unidirectional search, and this will then be missed. In contrast, the described embodiment, using the described Bidirectional-Spiral channel searching mechanism, ensures that the nearest free channel will be identified, thereby reducing radio parameter changes and thus reconfiguration of the radio elements of the device.

In bidirectional scanning, the search space is virtually divided and can be explored in either direction in alternate steps. The time and space complexity is O(n), which is the same as for the unidirectional search, but by searching bidirectionally, the spiral-bidirectional method has the advantage of finding a free channel nearer and, on average, more quickly than the unidirectional search, especially in dense non-uniform occupancy scenarios.

Considering the adopted goal of exploring more spectrum space and finding the nearest free-channel in a randomly distributed spectrum occupancy, this spiral-bidirectional scanning achieves the target accurately without compromising complexity.

By adopting bidirectional search, searching is performed in either direction, starting at a given frequency, and expands through the channel search space in both directions to find the nearest free channel for transmission.

The bidirectional-spiral mechanism and its variant schemes can be used in any general radio or reconfigurable radio seeking to switch or searching for nearest free channel. Currently available multi-band radios are controlled by BS. However, the invention should not be viewed by the reader as being limited to such arrangements and can be applied also to a distributed multi-band radio system, in which the act of seeking nearest free channel can make use of the described principle of bidirectional-spiral scanning.

Figure 5:
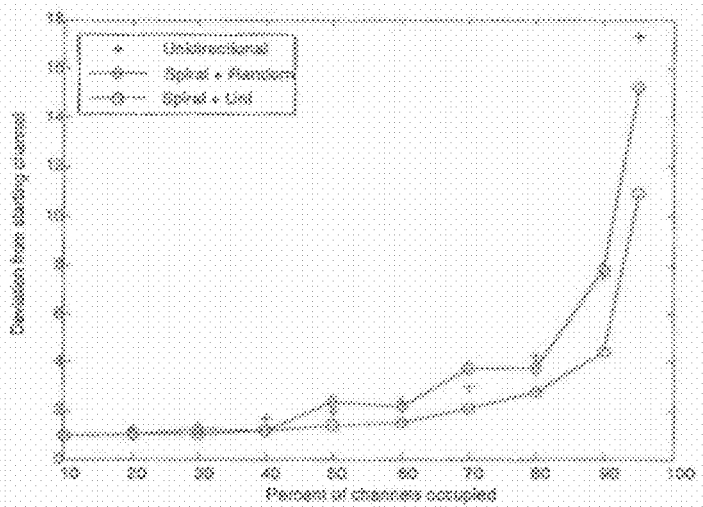
FIG. 5 illustrates graphically results of simulations performed to determine performance of the specific embodiment.

To emphasise this, simulations have been carried out and are now described. The simulations were carried out to compare the performance of several scanning mechanisms. FIG. 5 illustrates channel deviation from starting channel. The labelled Spiral+Uni scheme ensures minimum deviation and evidently outperforms unidirectional scanning. Performance is better for highly occupied spectrum scenarios.

Figure 6:
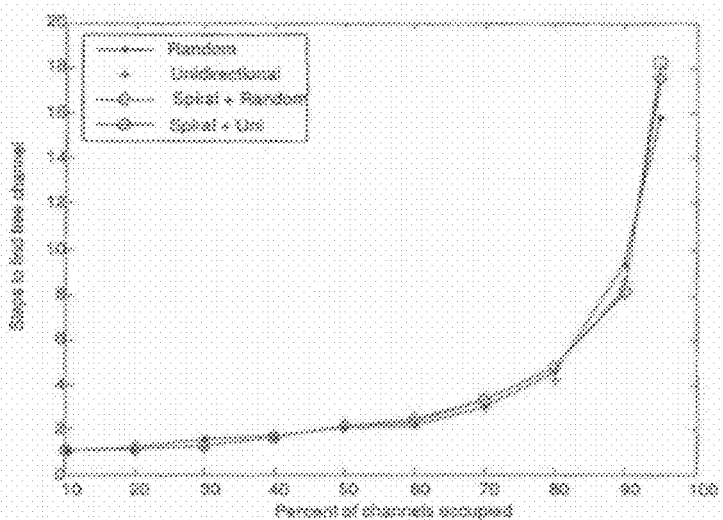
FIG. 6 illustrates graphically further results of simulations performed to determine performance of the specific embodiment.

FIG. 6 shows an average number of steps taken to find free channel. The Spiral mechanism in this example ensures the nearest free channel and, on average, an asymptotic number of steps as compared with other mechanisms, irrespective of the spectrum occupancy. With an equal number of steps, the spiral-bidirectional scanning mechanism ensures the nearest free channel in the dynamic spectrum.

Numerous modifications and variations of the present invention are possible in light of the above teachings. While the invention has been exemplified by the above description of specific embodiments, and uses thereof, the foregoing should not be considered by the reader as a limitation on the scope of the invention, which is defined in the appended claims. It is therefore to be understood that within the scope of the appended claims, the invention may be practices otherwise than as specifically described herein.

The invention claimed is:

1. A method of identifying an available channel of a plurality of frequency channels defined in a radio frequency spectrum for use in transmitting information from a transmitting station, the method comprising searching bidirectionally for an available channel on either side of an initial frequency.

2. A method in accordance with claim 1 wherein said step of bidirectional searching comprises determining channel availability for channels adjacent said initial channel in either direction away from said initial channel in said spectrum, then successively checking availability for more distant pairs of channels away from said initial frequency.

3. A method in accordance with claim 1 and including, on identification of a boundary in said frequency spectrum beyond which no available channels are defined, performing a boundary initiated search process.

4. A method in accordance with claim 3 wherein said boundary initiated search process comprises selecting at random an initial frequency and then recommencing said step of bidirectional searching from said randomly selected initial frequency.

5. A method in accordance with claim 3 wherein said boundary initiated search process comprises searching unidirectionally away from said boundary until an available channel is identified.

6. A method in accordance with claim 1 wherein said step of searching is conducted on the basis of stored information defining one or more channels defined as being unavailable for use.

7. A method of tuning a radio transmitting station, comprising the method of identifying an available channel in accordance with claim 1 and tuning said radio transmitting station to said identified available channel.

8. A method in accordance with claim 7 wherein said station is tuned to said initial frequency.

9. A method in accordance with claim 7 wherein said station is not tuned to a frequency and stores an initial search frequency to be used as an initial frequency in said method of identifying.

10. A method in accordance with claim 7 and including the step of transmitting, on said new channel, a channel reservation request.

11. A computer program product for implementing a method in accordance with claim 1.

12. A scanner for use in identifying an available channel of a plurality of frequency channels defined in a radio frequency spectrum for use in transmitting information from a transmitting station, the scanner being operable to search bidirectionally for an available channel on either side of an initial frequency.

13. A scanner operable to perform a search in accordance with claim 1.

14. Radio transmission apparatus comprising a scanner in accordance with claim 12, and a tuner operable on the basis of information obtained by the scanner to tune said radio transmitting station to an identified available channel.

15. Apparatus in accordance with claim 14 and including storage means for storing a start up frequency to be used as an initial frequency by said scanner.

* * * * *